United States Patent
Gottipati et al.

(10) Patent No.: US 12,153,496 B2
(45) Date of Patent: Nov. 26, 2024

(54) DATA MANAGEMENT SYSTEM FOR TRANSFERRING FILES BETWEEN DATABASES

(71) Applicant: Druva Inc., Santa Clara, CA (US)

(72) Inventors: Srikiran Gottipati, Vijayawada (IN); Milind Borate, Pune (IN); Nishith Chitaliya, Amravati (IN)

(73) Assignee: Druva Inc., Santa Clara, CA (US)

( * ) Notice: Subject to any disclaimer, the term of this patent is extended or adjusted under 35 U.S.C. 154(b) by 0 days.

(21) Appl. No.: 18/199,877

(22) Filed: May 19, 2023

(65) Prior Publication Data
US 2024/0028470 A1    Jan. 25, 2024

(30) Foreign Application Priority Data

Jul. 22, 2022 (IN) .............................. 202241042028

(51) Int. Cl.
| | | |
|---|---|---|
| G06F 11/14 | (2006.01) | |
| G06F 16/11 | (2019.01) | |
| G06F 16/176 | (2019.01) | |

(52) U.S. Cl.
CPC ........ *G06F 11/1461* (2013.01); *G06F 16/122* (2019.01); *G06F 16/1767* (2019.01); *G06F 2201/84* (2013.01)

(58) Field of Classification Search
CPC ............ G06F 11/1458; G06F 11/1461; G06F 11/1471; G06F 16/122; G06F 16/1767; G06F 2201/84; G06F 2201/81
See application file for complete search history.

(56) References Cited

U.S. PATENT DOCUMENTS

| | | | |
|---|---|---|---|
| 11,803,648 B2* | 10/2023 | Hetzler | ..................... H04L 9/14 |
| 2015/0178007 A1* | 6/2015 | Moisa | ................. H04L 67/1097 |
| | | | 713/190 |
| 2016/0275125 A1* | 9/2016 | Drobychev | ............. G06F 16/27 |

* cited by examiner

*Primary Examiner* — Etienne P Leroux
(74) *Attorney, Agent, or Firm* — Fenwick & West LLP (57) ABSTRACT

A data management system manages concurrent readers and writers for large file scans. The data management system may read a plurality of data chucks of the file starting from different offsets and generate a bounded number of read requests, which causes a data chuck identifiable by a data offset to be loaded into a data buffer. The system may queue the loaded data chucks for generating write requests to release the loaded data chunks. One or more write requests are generated responsive to one or more data chunks being associated with a consecutive order of data offsets being successfully loaded to data buffers. The system may write data chucks released from the buffer-rounded reading stage to the data storage in a checkpointed writing stage. The checkpointed writing stage creates a checkpoint based on the data offset of the data chucks that have been completely transferred to the data storage.

20 Claims, 9 Drawing Sheets

Reading chunks of a file from the data source in a buffer-bounded reading stage, the buffer-bounded reading stage comprising:
610

Generating a bounded number of read requests, each read request causing a data chunk identified by a data offset to be loaded into a buffer, wherein data chunks are loaded into the buffer concurrently
620

Queuing loaded data chunks for generating write requests to release the loaded data chunks, wherein write requests are generated responsive to data chunks associated with a consecutive order of data offsets are successfully loaded to the buffer
630

Generating an additional read request in response to a release of a loaded data chunk
640

Writing released data chunks released from the buffer-bounded reading stage to the data storage in a checkpointed writing stage, the checkpointed writing stage creates a checkpoint based on the data offset of data chunck that has completely transferred to the data storage
650

DATA MANAGEMENT SYSTEM FOR TRANSFERRING FILES BETWEEN DATABASES

CROSS-REFERENCE TO RELATED APPLICATION

This application claims the benefit of Indian Provisional Application No. 202241042028, filed Jul. 22, 2022, which is herein incorporated by reference for all purposes.

TECHNICAL FIELD

The disclosed embodiments are related to data management systems, and, more specifically, to a data management system that may efficiently transfer files between data storages.

BACKGROUND

To protect against data loss, organizations may periodically backup data to a backup system and restore data from the backup system. In some cases, the backup data may comprise files in large sizes such as large data files or a snapshot of virtual disks within a virtual machine. Conventionally, to restore one or more individual files of the disk snapshot, the entire disk snapshot would be restored. However, scanning large files can be expensive, compute and network resource intensive, and time consuming. Therefore, a more efficient implementation for reading and writing a single large file is needed.

SUMMARY

A data management system is disclosed with example embodiments related to systems and processes of data transferring associated with files in virtual machines that improve the efficiency and cost of performing such data transfer. Backup snapshots of a virtual machine stored in a client device may periodically be captured and sent to a data store for storage. The snapshots may include individual files. A separate or the same client device may request to retrieve one or more individual files from the data store.

The data management system may scan a single file in concurrent mode using a concurrent reader and write the file in concurrent mode using a concurrent reader, which ensures high efficiency during the data transfer process. The data management system may also track the writing process to be able to check point file transfers periodically or upon receiving requests from clients.

To read the file in a concurrent mode using the concurrent reader, the data management system may read a plurality of data chunks of the file starting from different offsets. The data management system may generate a bounded number of read requests, which causes a data chunk identifiable by a data offset to be loaded into a data buffer. The plurality of data chunks may be loaded into data buffers concurrently for higher efficiency. The data management system may queue the loaded data chunks for generating write requests to release the loaded data chunks. One or more write requests are generated in response to one or more data chunks being associated with a consecutive order of data offsets being successfully loaded to data buffers. The data management system may generate an additional read request in response to a release of a loaded data chunk.

In accordance with an embodiment, the data management system may write data chucks chunks released from the buffer-rounded reading stage to the data storage in a checkpointed writing stage. The checkpointed writing stage creates a checkpoint based on the data offset of the data chunks that have been completely transferred to the data storage.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

Figure 1:
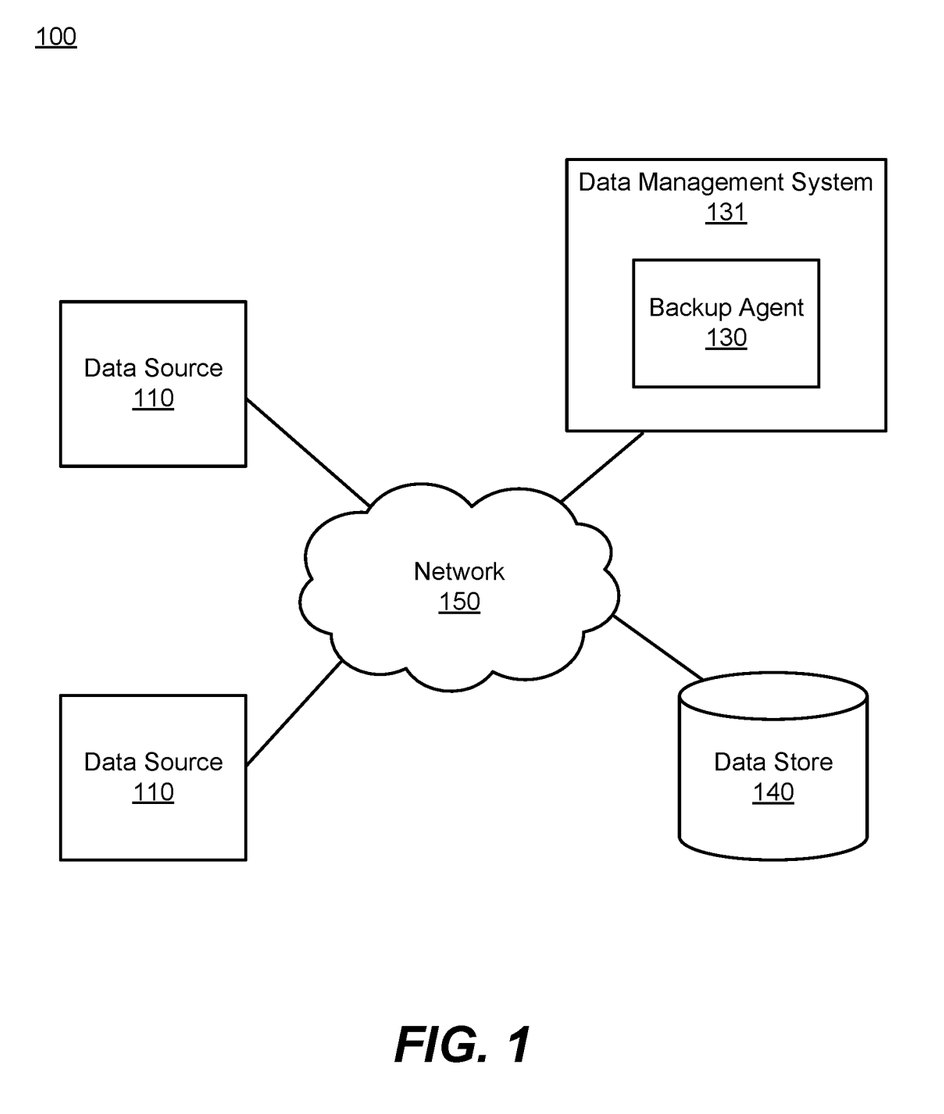
FIG. 1 is a block diagram illustrating a system environment of an example data management system with a backup agent, in accordance with an embodiment.

FIG. 1 is a block diagram illustrating a system environment 100 of an example data management system, in accordance with an embodiment. By way of example, the system environment 100 may include one or more data sources 110, a data management system 131 that includes a backup agent 130, a data store 140, and a network 150. In various embodiments, the system environment 100 may include fewer and additional components that are not shown in FIG. 1.

The various components in the system environment 100 may each correspond to a separate and independent entity or some of the components may be controlled by the same entity. For example, in one embodiment, the data management system 131 and the data store 140 may be controlled and operated by the same data storage provider company while the data source 110 may be controlled by an individual client. In another embodiment, the data management system 131 and the data store 140 may be controlled by separate entities. For example, the data management system 131 may be an entity that utilizes various popular cloud data service providers as data stores 140. The components in the system environment 100 may communicate through the network 150. In some cases, some of the components in the environment 100 may also communicate through local connections. For example, the data management system 131 and the data store 140 may communicate locally. In another example, the data source 110 and the target device 120 may communicate locally.

A data source 110 may be a computing device that can transmit and/or receive data via the network 150. The data source 110 can be a client device, a client server, a client database, a virtual machine, a local backup device (e.g., NAS) or another suitable device that has data to be backed up. In one embodiment, the data source 110 may send a request to store, read, search, delete, modify, and/or restore data (e.g., virtual machine data) stored in the data store 140. Data from a data source 110 may be captured as one or more snapshots of the data source 110 and be stored in the data store 140. A client that uses the data source 110 to perform such operations may be referred to as a user or an end user of the data management system 131. The data source 110 also may be referred to as a user device or an end user device. The data source 110 may be any computing device. Examples of such client devices 110 include personal computers (PC), desktop computers, laptop computers, tablets (e.g., APPLE iPADs), smartphones, wearable electronic devices such as smartwatches, or any other suitable electronic devices. The clients may be of different natures such as including individual end users, organizations, businesses, and other clients that use different types of client devices (e.g., target devices) that run on different operating systems. The data source 110 may take the form of software, hardware, or a combination thereof (e.g., some or all of the components of a computing machine of FIG. 7).

The data management system 131 may manage data backup and restoration between the data source 110 and the data store 140. In one embodiment, an operator of the data management system 131 may provide software platforms (e.g., online platforms), software applications for installation in the data source 110, application programming interfaces (APIs) for clients to manage backup and restoration of data, etc. In one embodiment, the data management system 131 manages data of the data source 110 that is stored in the data store 140. For example, the data management system 131 may transmit data to and/or from the data source 110. In another embodiment, the data management system 131 manages data of the data store 140 that is retrieved and restored in the target device 120. For example, the data management system 131 may use a backup agent 130 to transmit data to and/or from the target device 120. In this disclosure, data management servers 131 may collectively and singularly be referred to as a data management system 131, even though the data management system 131 may include more than one computing device. For example, the data management system 131 may be a pool of computing devices that may be located at the same geographical location (e.g., a server room) or distributed geographically (e.g., cloud computing, distributed computing, or in a virtual server network).

The data management system 131 may include a backup agent 130 that creates backups of data of the data source 110. The backup agent 130 may upload the backup data to the data store 140. A backup operation may be triggered by an action performed at a data source 110 or by an event, may be scheduled as a regular backup, or may be in response to an automated backup task initiated by the data management system 131 to a data source 110. In one embodiment, the backup agent 130 may poll a data source 110 periodically and receive files to be backed up and corresponding metadata, such as file names, file sizes, access timestamps, access control information, and the like. In one embodiment, the backup agent 130 may perform incremental backup operations that leverage data from previous backup cycles to reduce the amount of data to store. The backup agent 130 may store the files of the client device as data blocks in the data store 140.

In one embodiment, the backup agent 130 may receive snapshots of the data source 110. A snapshot may be a set of copies of files that reflect the state of the data source 110 and/or the state of the data source 110 at the capture time (e.g., during a checkpoint). A snapshot, in one example, may be an image of the storage (or a portion of the storage) of a data source 110 that is captured at a particular moment in time. The moment in time may be referred to as a checkpoint. A snapshot may be a complete image or an incremental image. For example, an initial backup of a device may generate a snapshot that captures a complete image of a set of files in the data source 110 (e.g., a complete image of the internal file system 240). Subsequent checkpoints may generate snapshots of incremental images that represent the differential changes of the data source 110.

In one embodiment, a snapshot may be divided into data blocks that are saved in various different locations in the data store 140. A data block may be a set of bits that represent data of a file or multiple files. Files may be of various sizes compared to a data block. For example, a large file may include multiple data blocks while a single data block may contain data of a combination of various small files. Data of a file may be retrieved by the identifiers of data blocks (e.g., an external file address, data blocks' addresses, checksums, etc.) and offsets of the starting and ending data blocks. Various individual data blocks of a snapshot may be stored in different locations of a data store 140 and sometimes may not be grouped. In some data stores 140, a data block may be started in a random location based on the checksum or another identifiable fingerprint of the data block (or the object containing the data block) as the address or identifier of the data block. Some data stores 140 use files as units to save the data instead of dividing files as data blocks that are fixed length.

The data management system 131 may use the backup agent 130 to manage data backup and restoration. The backup agent 130 may include a concurrent reader and a concurrent writer for performing efficient read and write operations concurrently on file with large size (e.g., larger than a threshold level). The backup agent 130 may read a single file in concurrent mode by using multiple read requests, each reading the file from the different offset (i.e., location in the file). The backup agent 130 may also manage the different read requests and ensure that the data chunks are ordered in a correct order. The backup agent 130 may then write data to destination in concurrent mode by generating multiple write request. The backup agent 130 may write data chunks concurrently to the destination while tracking the write offsets and commit offsets so that the writing process may be checkpointed periodically or per requests. The backup agent 130 is further described with FIG. 2.

Figure 7:
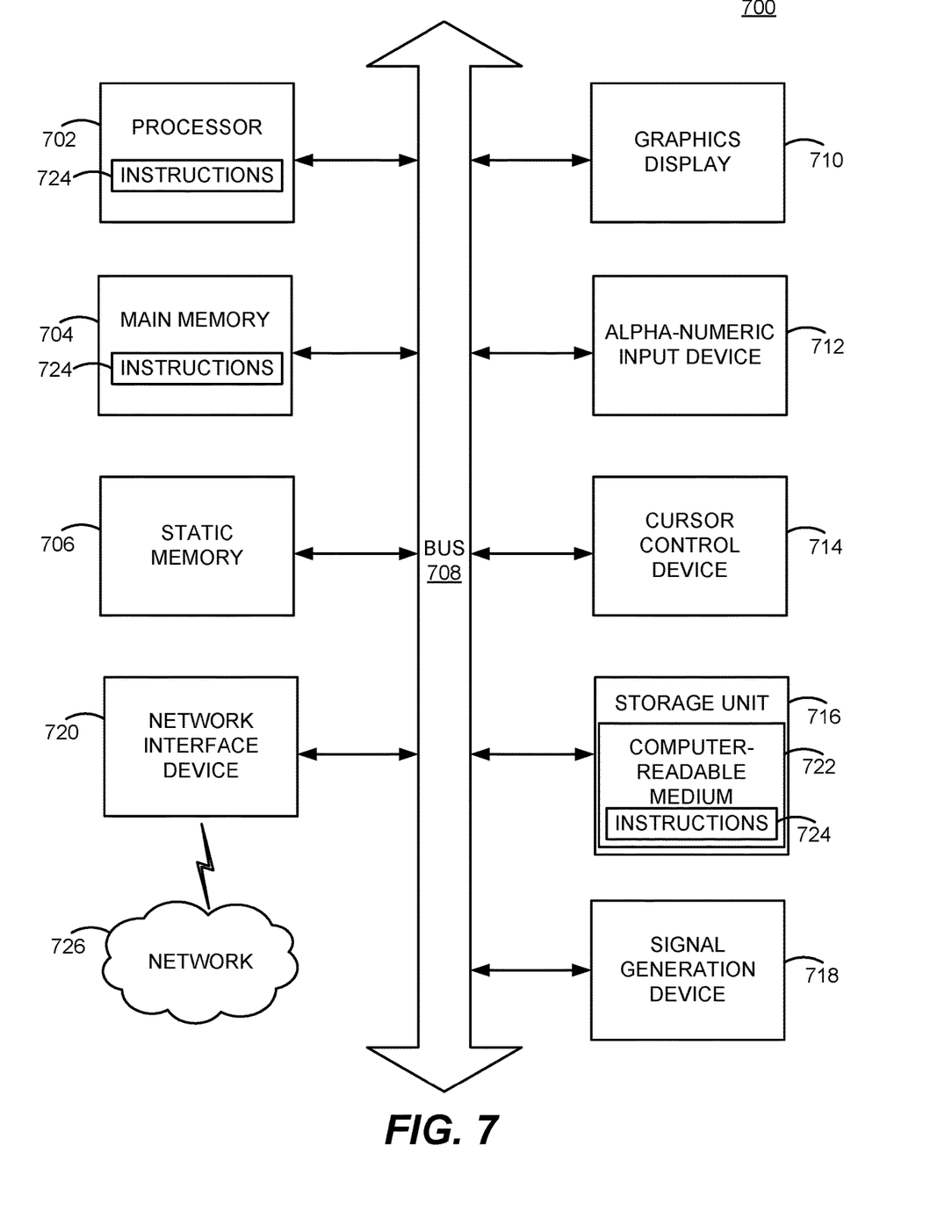
FIG. 7 is a block diagram illustrating components of an example computing machine, in accordance with an embodiment.

In one embodiment, a computing device of the data management system 131 may take the form of software, hardware, or a combination thereof (e.g., some or all of the components of a computing machine of FIG. 7). For example, parts of the data management system 131 may be a PC, a tablet PC, a smartphone, an internet of things (IoT) appliance, or any machine capable of executing instructions that specify actions to be taken by that machine. Parts of the data management system 131 may include one or more processing units and a memory.

The data store 140 may communicate with the data source 110 via the network 150 for capturing and restoring snapshots and/or files of a data source 110. The data store 140 may also work with the data management system 131 to cooperatively perform data transmission of data from the data source 110. The data store 140 may include processes running in the data store 140. The data store 140 may include one or more storage units such as memory that may take the form of non-transitory and non-volatile computer storage medium to store various data. The data store 140 may also be referred to as cloud storage servers. Example cloud storage service providers may include AMAZON AWS, DROPBOX, RACKSPACE CLOUD FILES, AZURE BLOB STORAGE, GOOGLE CLOUD STORAGE, etc. In other cases, instead of cloud storage servers, the data store 140 may be a storage device that is controlled and connected to the data management system 131. For example, the data store 140 may be memory (e.g., hard drives, flash memory, discs, tapes, etc.) used by the data management system 131.

The data store 140 may store various backups (e.g., files and/or snapshots of client virtual machines). The data store 140 communicates with the backup agent 130 for reading and writing data between the data source 110 and the data store 140. The data may include files and/or snapshots of the client virtual machines stored at external file address locations in the data store 140.

The data store 140 may use different data storage architectures to manage and arrange the data. The data storage framework for the data store 140 may sometimes be referred to as an external file system in this disclosure, as opposed to a file system that is internal to a virtual machine. A file system defines how an individual computer or system organizes its data, where the computer stores the data, and how the computer monitors where each file is located. A file system may include file directories. In some cases, the external file system may manage data as a file hierarchy. In another example, the external file system may take the form of an object storage system and manage data as objects. In some embodiments, the external file system may manage data as blocks within sectors and tracks. With block storage, files are split into blocks (evenly sized or not) of data, each with its own address. Block storage may be used for most applications, including file storage, snapshot storage, database storage, virtual machine file system (VMFS) volumes, etc.

Each file stored in the data store 140 may include metadata. Metadata is data that describes a file, such as a timestamp, version identifier, file directory including timestamp of edit or access dates, add and carry logical (ACL) checksums, journals including timestamps for change event, etc.

The communications among the data source 110, the data management system 131, and the data store 140 may be transmitted via a network 150, for example, via the Internet. The network 150 provides connections to the components of the system 100 through one or more sub-networks, which may include any combination of local area and/or wide area networks, using both wired and/or wireless communication systems. In one embodiment, a network 150 uses standard communications technologies and/or protocols. For example, a network 150 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 150 may be represented using any suitable format, such as hypertext markup language (HTML), extensible markup language (XML), or JSON. In some embodiments, all or some of the communication links of a network 150 may be encrypted using any suitable technique or techniques such as secure sockets layer (SSL), transport layer security (TLS), virtual private networks (VPNs), Internet Protocol security (IPsec), etc. The network 150 also includes links and packet switching networks such as the Internet.

Example Backup Agent

Figure 2:
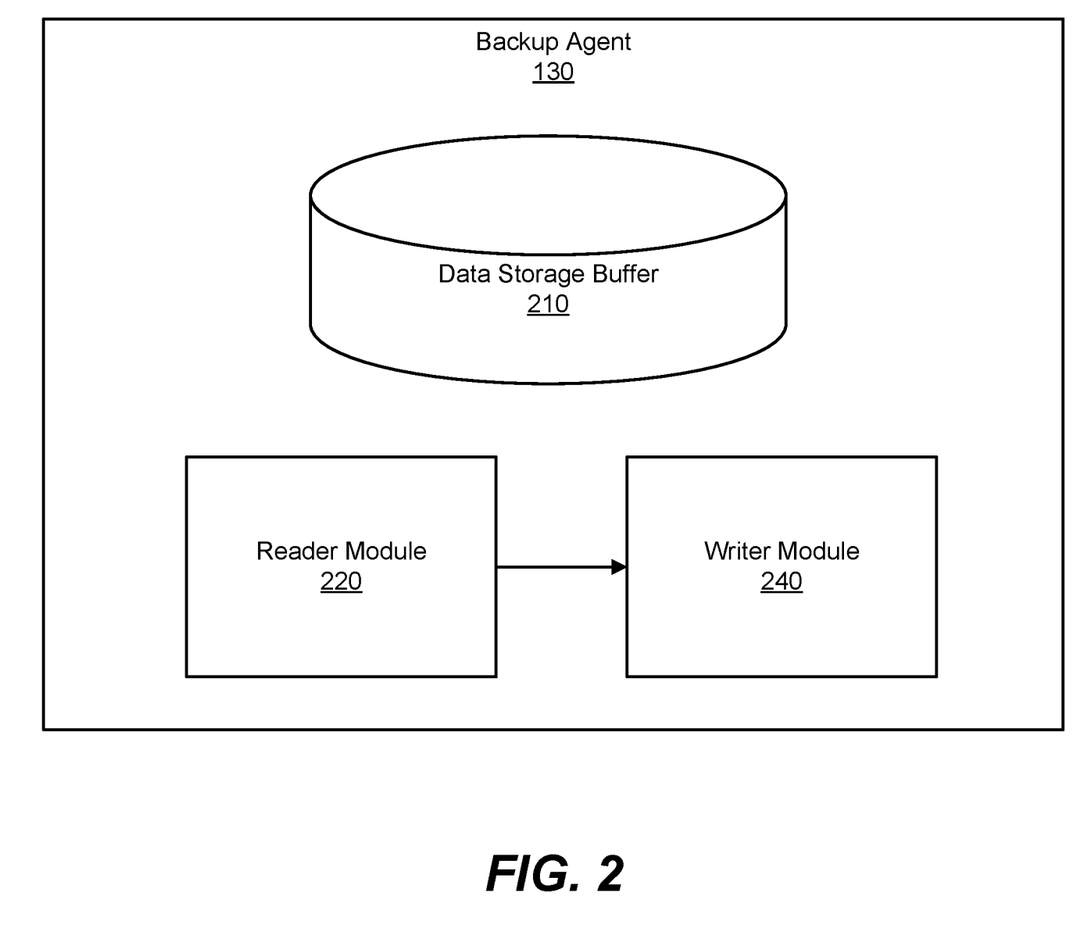
FIG. 2 is a block diagram illustrating an architecture of an example backup agent, in accordance with an embodiment.

Referring now to FIG. 2, illustrated is a block diagram of an architecture of an example backup agent 130, in accordance with an embodiment. An example of detailed hardware architecture of the backup agent 130 is illustrated in FIG. 7.

The backup agent 130 may manage data via backups and/or restorations. The backup agent 130 may include a data storage buffer 210, a reader module 220, and a writer module 240. In some embodiments, the data source 110 may include additional, fewer, or different components for various applications. As with other modules described herein, the reader module 220 and the writer module 240 may be structured as a software program (e.g., comprised of instructions) stored in a memory and executable by a processor (e.g., as described with FIG. 7) to execute functionality described herein.

The functions of the backup agent 130 may be distributed among the components in a different manner than described. The backup agent may use the reader module 220 and the writer module 240 for performing efficient read and write operations concurrently on file with large size (e.g., larger than a threshold level). The backup agent 130 may read a single file in concurrent mode by using multiple read requests, each reading the file from the different offset (i.e., location in the file). The backup agent 130 may write data to destination in concurrent mode by generating multiple write request. The backup agent 130 may write data chunks concurrently to the destination while tracking the write offsets and commit offsets so that the writing process may be checkpointed periodically or per requests. Further details with regard to the reader module 220 and the writer module 240 are described with FIGS. 3-5.

The data storage buffer 210 may be a portion of memory that contains data that has not yet been fully committed to destination. The data storage buffer 210 may temporarily store data waiting to be consumed by the reader module 220 or the writer module 240.

Example Reader Module and Write Module

Figure 3A:
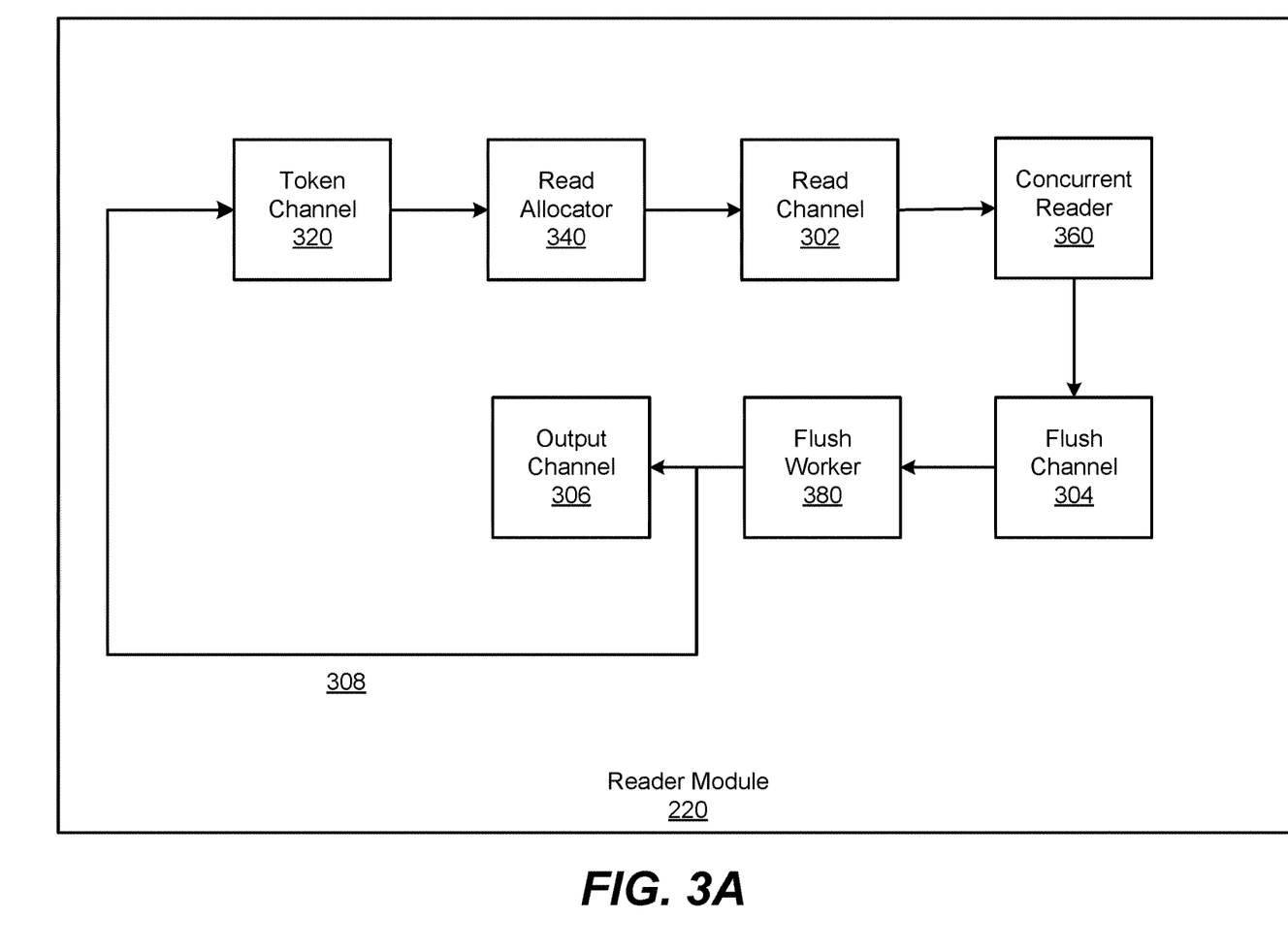
FIG. 3A is a block diagram illustrating an exemplary single pipelined reader of the data management system, in accordance with an embodiment.
Figure 3B:
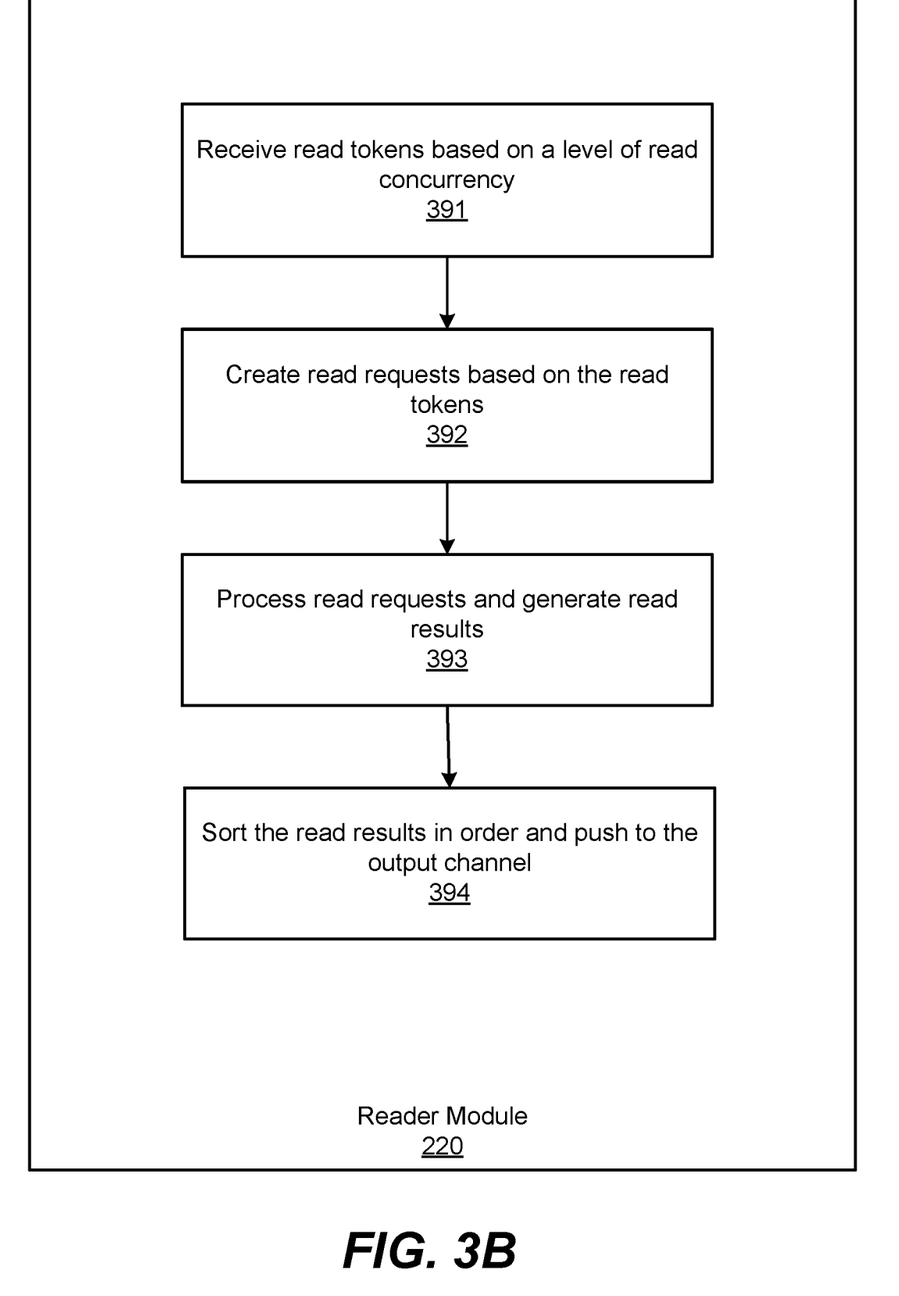
FIG. 3B is a processing flowchart illustrating an exemplary process for reading a file using a single pipelined reader illustrated in FIG. 3A.

Turning now to FIGS. 3A and 3B, FIG. 3A illustrates an exemplary pipelined reader module 220 and FIG. 3B illustrates an exemplary process flow for a single pipelined reading process using the reader module 220 of the data management system, in accordance with an embodiment. The reader module 220 may include a plurality of components pipelined as illustrated in FIG. 3A. The reader module 220 may include a token channel 320, a read allocator 340, a read channel 302, a concurrent reader 360, a flush channel 304, a flush worker 380, and an output channel 306.

The token channel 320 may control a level of desired read concurrency using read tokens. The token channel 320 may receive 391 read tokens generated by the reader module 220 based on a level desired concurrency. Each read token may be associated with a different offset that indicates a location in the file, and each read token may use the offset as a starting point for reading the file. The token channel 320 may also receive read tokens from flush worker 380 once the data loaded in the read tokens are flushed to the output channel 306. The available tokens may be ready for the read allocator 340 to use.

The read allocator 340 may create 392 read requests based on the read tokens. The read allocator 340 may acquire the read tokens from the token channel once the read tokens are available. The read allocator 340 may allocate a buffer of a pre-determined size. The predetermined size may be a chunk size specified by a human operator. The read allocator 340 may then create a read request with a plurality of parameters. The plurality of parameters may specify the buffer (e.g., a pointer to the buffer allocated for the read request), an offset (e.g., the position in the file to start the read process), and a size (e.g., the specified buffer size). After the read request is generated, the read allocator 340 may then pass the read request to the concurrent reader 360.

The concurrent reader 360 may process 393 the read requests and generate read results. The concurrent reader 360 may generate read results and post the read results on to the flush channel 304. In one embodiment, although the read requests are generated in-order based on the offsets for each file, the processing of the read requests can happen out of order. As a result, the read results generated by the concurrent reader 360 may be posted on the flush channel out-of-order. The order of the read results may be adjusted to the correct order by the flush worker 380, which is discussed below.

The flush channel 304 may be a queue or array that holds the read results generated by the concurrent reader 360. The flush channel 304 may hold the read results and push the read results down to the flush worker 380 once the flush worker 380 becomes available to take additional read results.

The flush worker 380 may ensure that the read results are pushed 394 to the output channel 306 in a correct order. The flush worker 380 may wait on the flush channel 304 for read results. The flush worker 380 may maintain a next read offset initialized to zero and an array of read results sorted by offsets. The next read offset indicates the position of the file that associated with the latest read result in order. The flush worker 380 may ensure that the read results are ordered in the correct order. In one embodiment, upon receiving a read result, the flush worker 380 may check whether the offset of the read result matches the next read offset maintained by the flush worker 380. In response to the offset matching the next read offset, the flush worker 380 may add the read result to the array of read results. If the offset of the read result matches the next read offset, the flush worker 380 may push the read result to the output channel 306 and increment the next read offset by the read chunk size, which indicates that the current read offset (i.e., current progress of file reading) is moved forward by the chunk size. If the array of read results contains the read result, with the offset of the read result matching the next read offset, the flush worker 380 may move remove the read result from the array and push the read result to the output channel and then increment the next read offset by the chunk size. For example, if the current next read offset=4, and the array for read results is [5, 6, 8, 13], a read result with offset=4 will be pushed to the output channel 306. Then, the next read offset will be updated to 5, which will result in the read result in the array with offset 5 to be pushed to the output channel 306. Similarly, the read result with offset=6 will then be pushed to the output channel 306. At this point, the next read offset=7, and the array of read results is [8, 13]. After the flush worker 380 pushes the read results onto the output channel, the flush worker 380 may push a read token back onto the token channel 320.

Figure 4:
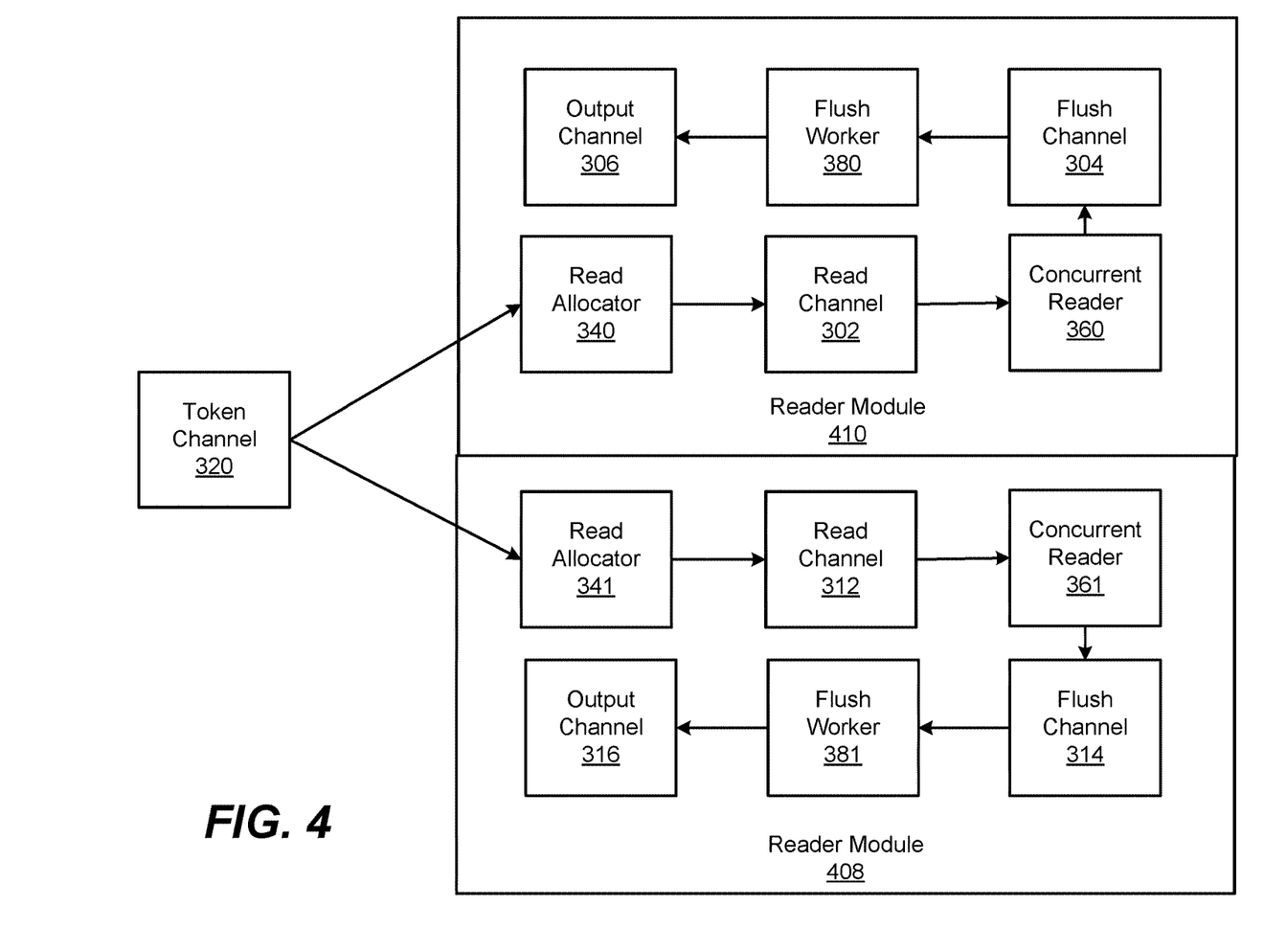
FIG. 4 is a flowchart illustrating an exemplary process for a multiple pipelined reading process using the data management system, in accordance with an embodiment.

FIG. 4 is a flowchart illustrating an exemplary process for a multiple pipelined reading process using the data management system, in accordance with an embodiment. In one embodiment, the reader module 220 may set up multiple pipelined reader modules to scale up the file reading process. FIG. 4 illustrates a reading process with two reader modules concurrently. In FIG. 4, reader module 408 and 410 may each read from a different file. The reader modules 408 and 410 may share a same token channel 320. The two reader modules then may each use a pipelined reader module 408 and 410 for generating, processing, and ordering the read requests and read results. The generated read results may be pushed onto the respective output channel 306 and 316.

Figure 5A:
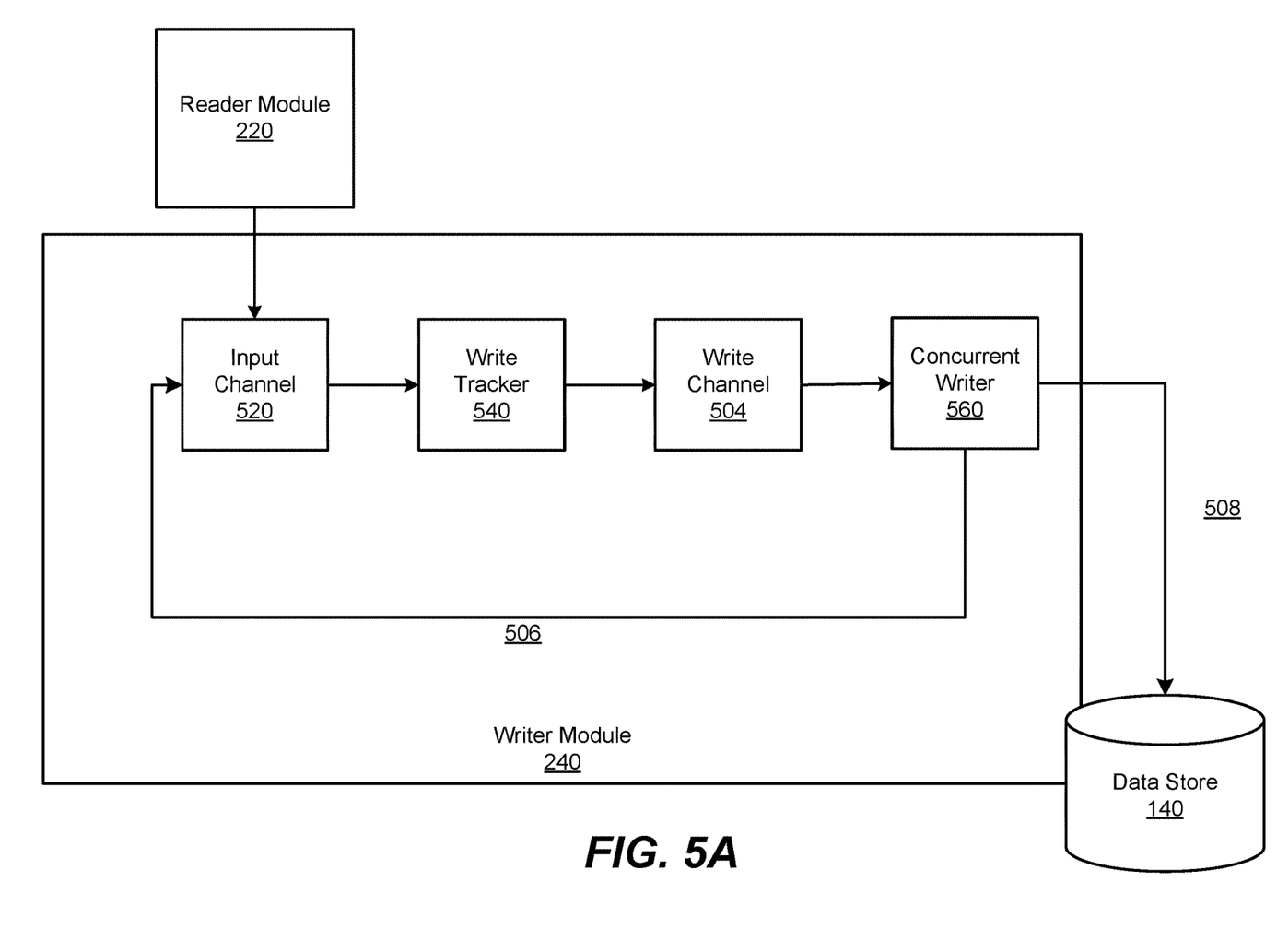
FIG. 5A is a block diagram depicting an exemplary pipelined writer of the data management system, in accordance with an embodiment.
Figure 5B:
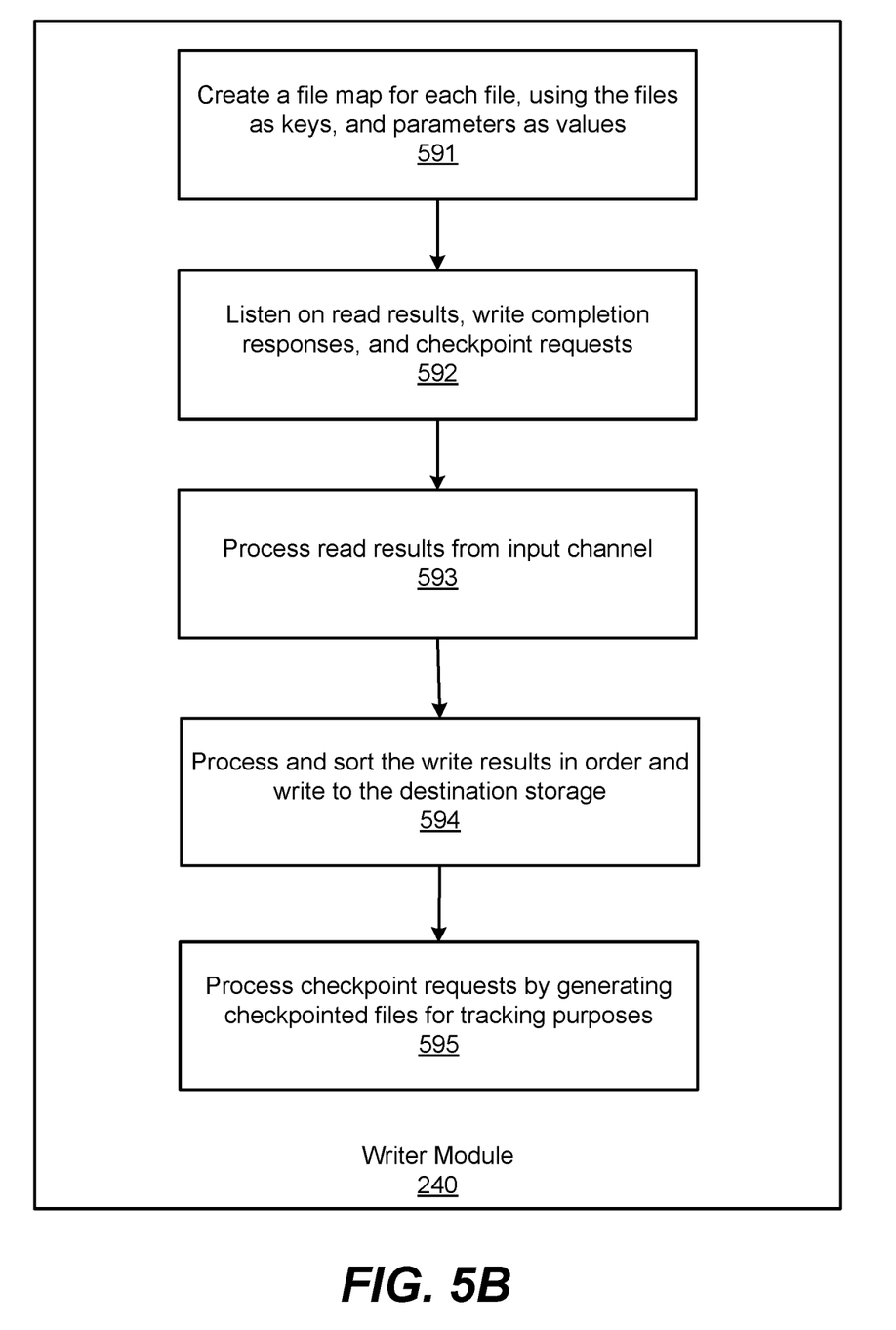
FIG. 5B is a flowchart depicting an example process of writing data using the data management system, in accordance with an embodiment.

Referring to FIGS. 5A and 5B, FIG. 5A illustrates an exemplary pipelined writer module 240 and FIG. 5B illustrates an exemplary process flow for a single pipelined writing process using the writer module 240 of the data management system, in accordance with an embodiment. In the embodiment illustrated in FIG. 5A, the writer module 240 may include an input channel 520, a write tracker 540, a write channel 504, and a concurrent writer 560. In one embodiment, the input channel 520 may be set up as the output channel 306 of the reader module 220. In some embodiments, the writer module 240 may include an additional buffer between the output channel of the reader module 220 and the input channel 520.

The write tracker 540 may process the read results, generate write results, and create checkpoints for tracking the write process. The write tracker 540 may create 591 a file map for each file. The file map may use the files as keys and a plurality of parameters as values. For example, the plurality of parameters may include a file size that indicates the size of the file, a write offset, that indicates the current position of the write process, a and a set of offsets, which may be a set of offsets associated with the write of results yet to be processed. The write tracker 540 may receive and respond to results from a plurality of sources. For example, the write tracker 540 may listen on 592 the input channel 520 for read results from the upstream reader module 220 that is reading large files from source storage. The write tracker 540 may also listen on 592 write completion responses from the concurrent writers that are writing to destination storage. The write tracker 540 may also listen on 592 check point requests and create check points for tracking purposes. The process for responding to read results, write results, and check point requests are discussed in greater detail below.

The write tracker 540 may process 593 read results from the input channel 520. Responsive to each received read result from the reader module 220, the write tracker 540 may first check if an entry for the file exists in the file map. If the file does not exist in the file map, the write tracker 540 may add an entry in the file map, with the file as the key a set of initialized parameters as value. For example, the set of parameters may be initialized as, file size=MaxInt64, write offset=0, and set of offsets=<empty>. If the file exists in the file map, the write tracker 540 may look up the value with the file as key from the file map. The write tracker 540 may then check if the file has reached the end, that is, if the write process of the file is completed by checking an EOF (end of file) indicator. If the EOF indicator is true, then the write tracker 540 may set the parameter, file size as the offset of the read result plus the size of the data included in the read result. That is, the file size is set by the last chunk of data included in the read result that includes an EOF indicator. If the file size is MaxInt64, it means that the file reading process is not completed yet. The write tracker 540 may update the write offset with the offset of the read result and insert the offset of the read result into the set of offsets. If the file size is not MaxInt64, it means that the file reading process is complete. The writing process is complete when the file size is not MaxInt64 and the file map is empty. Because the reader module 220 sends data chunks for each file in sequence and in ascending order based on their offsets, a write offset of value N may indicate that the chunk at offset N and all chunks before the offset N have been received and sent to the concurrent writer 560. The write tracker 540 may then create write requests and send the write requests to the concurrent writer 560 for writing the data to the file at the offset on the destination storage such as data store 140.

The write tracker 540 may process 594 write results posted on an event channel by the concurrent writer 560. In one embodiment, each write result may be associated with a plurality of parameters such as file, data included in the file, and offset that indicates an location in the file for the write result. Responsive to receiving a write result from the concurrent writer 560, the write tracker 540 may look up the value with the file as the key from the file map. The value may include a plurality of parameters comprising offset, file size, and set of offsets. The write tracker 540 may remove the offset of the read result from the set of offsets, indicating that the write result associated with the offset has been written completely. After removing the set from the set of offsets, the write tracker 540 may check if the set of offsets is empty. If the set of offsets is empty and the file size is not MaxInt64, the write tracker 540 may remove the file from the file map because there are no more pending write offsets and the reading process is complete, which means that the file writing process is complete. In one embodiment, the file map may be empty when the reading process is not complete. For example, the file reader may be temporarily starved for (e.g., short of) tokens where tokens are shared with other readers.

The write tracker 540 may process 595 checkpoint requests by generating checkpointed files for tracking purposes. Responsive to receiving a checkpoint request, the write tracker 540 may copy the file map and create a new checkpointed map. The checkpointed map may have files as keys and a plurality of parameters as values. The plurality of parameters may include a file size, and a commit offset. The file size may indicate a current size of the file that has been processed. The commit offset may be calculated as the minimum offset from the corresponding parameter set of offsets. If the set of offsets is empty, the write offset may be used as the commit offset. The write tracker 540 may then persist the checkpointed file map as the checkpoint for the ongoing concurrent large file scans.

The concurrent writer 560 may receive write requests from the write channel 504 and ensure that the data is written to the destination in order. Although the write requests are generated in-order based on the offsets for each file, the processing the write requests may happen out of order. The concurrent writer 560 may (similarly to the concurrent reader 360) maintain an array of write requests and a current file offset. The concurrent writer 560, before posting a write result, may check whether the offset of the write result matches the file offset, which indicates the next offset to write. If the offset of the write result matches the file offset, the concurrent writer 560 may post the write result. If the offset of the write result does not match the file offset, the concurrent writer 560 may determine that the write result need to wait for other potential write results that come before the current write result, and store the current write result to an array of write result.

Zero Loss of Work Checkpoint

The writer module 240 may terminate a scan in a controlled manner with all read data uploaded and no writes lost (i.e., with no uncommitted writes). Upon receiving a controlled termination request, the writer module 240 may freeze read allocators 340 in all pipelined reader modules so the read allocators do not generate any more read requests. When each concurrent reader reaches a freeze point, where there are no more pending requests, for every file that is being read, the writer module 240 may generate a write freeze offset, where all data chunks before that offset are read and no chunk after the write freeze offset is read. The writer module 240 may determine that all concurrent readers 360 have reached each respective freeze point when all read tokens are accounted for in the token channel 320. After all concurrent readers 360 collectively reach write freeze point respectively, the write tracker 540 may wait for the completion of all write requests when the set of offsets in the file map is empty. At this point, every chunk of every file is written to the destination storage up to the corresponding freeze offsets and chunk beyond the write freeze offset is written. The write freeze offset may be referred to as the freeze offset of the file. The write tracker 540 may then take a last checkpoint before exiting the scan process.

Figure 6:
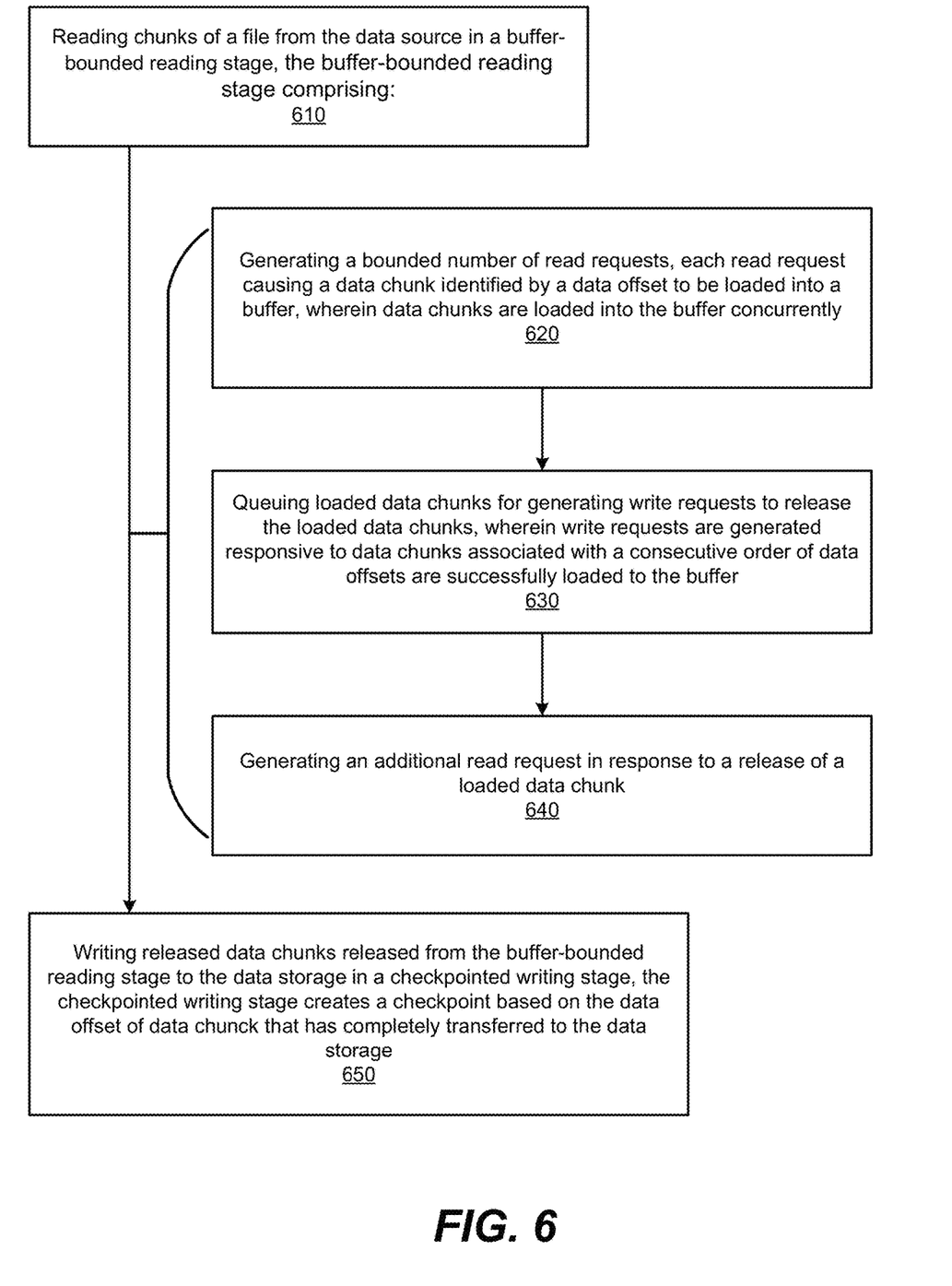
FIG. 6 is a flowchart depicting an example process of transferring data between databases using the data management system, in accordance with an embodiment.

FIG. 6 is a flowchart depicting an example process of transferring data between databases using the data management system, in accordance with an embodiment. The reader module 220 may read 610 data chunks of a file to be transferred from the data source in a buffer-bounded reading stage. The reader module 220 may generate 620 a bounded number of read requests, each read request causing a data chunk identified by a data offset to be loaded into a read buffer. The data chunks are loaded into the buffer concurrently. The reader module 220 may queue 630 the loaded data chunks for generating write requests to release the loaded data chunks, wherein the write requests are generated responsive to data chunks associated with a consecutive order of data offsets are successfully loaded to the buffer. The reader module 220 may generate 640 an additional read request in response to a release of a loaded data chunk. The writer module 240 may write 650 released data chunks released from the buffer-bounded reading stage to the data storage 140 in checkpointed writing stage. The checkpointed writing stage creates a checkpoint based on the data offset of data chunk that has completely transferred to the data storage.

Computing Machine Architecture

FIG. 7 is a block diagram illustrating components of an example computing machine that is capable of reading instructions from a computer readable medium and execute them in a processor. A computer described herein may include a single computing machine shown in FIG. 7, a virtual machine, a distributed computing system that includes multiples nodes of computing machines shown in FIG. 7, or any other suitable arrangement of computing devices.

By way of example, FIG. 7 shows a diagrammatic representation of a computing machine in the example form of a computer system 700 within which instructions 724 (e.g., software, program code, or machine code), which may be stored in a computer readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 7 may correspond to any software, hardware, or combined components shown in FIGS. 1-6, including but not limited to, the data source 110, the data management system 131, and various engines, interfaces, terminals, and machines shown in FIGS. 1-6. While FIG. 7 shows various hardware and software elements, each of the components described in FIGS. 1-6 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 724 that specify actions to be taken by that machine. Further, while only a single machine is illustrated, the term "machine" and "computer" also may be taken to include any collection of machines that individually or jointly execute instructions 724 to perform any one or more of the methodologies discussed herein.

The example computer system 700 includes one or more processors 702 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 700 also may include memory 704 that store computer code including instructions 724 that may cause the processors 702 to perform certain actions when the instructions are executed, directly or indirectly by the processors 702. Memory 704 may be any storage devices including non-volatile memory, hard drives, and other suitable storage devices. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 702 and reduces the space required for the memory 704. For example, the architecture and methods described herein reduce the complexity of the computation of the processors 702 by applying one or more novel techniques that simplify the steps generating results of the processors 702, and reduce the cost of restoring data. The algorithms described herein also reduce the storage space requirement for memory 704.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 700 may include a main memory 704, and a static memory 706, which are configured to communicate with each other via a bus 708. The computer system 700 may further include a graphics display unit 710 (e.g., a plasma display panel (PDP), a liquid crystal display (LCD), a projector, or a cathode ray tube (CRT)). The graphics display unit 710, controlled by the processors 702, displays a graphical user interface (GUI) to display one or more results and data generated by the processes described herein. The computer system 700 also may include alphanumeric input device 712 (e.g., a keyboard), a cursor control device 714 (e.g., a mouse, a trackball, a joystick, a motion sensor, or other pointing instrument), a storage unit 716 (a hard drive, a solid state drive, a hybrid drive, a memory disk, etc.), a signal generation device 718 (e.g., a speaker), and a network interface device 720, which also are configured to communicate via the bus 708.

The storage unit 716 includes a computer readable medium 722 on which is stored instructions 724 embodying any one or more of the methodologies or functions described herein. The instructions 724 also may reside, completely or at least partially, within the main memory 704 or within the processor 702 (e.g., within a processor's cache memory) during execution thereof by the computer system 700, the main memory 704 and the processor 702 also constituting computer readable media. The instructions 724 may be transmitted or received over a network 726 via the network interface device 720.

While computer readable medium 722 is shown in an example embodiment to be a single medium, the term "computer readable medium" should be taken to include a single medium or multiple media (e.g., a centralized or distributed database, or associated caches and servers) able to store instructions (e.g., instructions 724). The computer readable medium may include any medium that is capable of storing instructions (e.g., instructions 724) for execution by the processors (e.g., processors 702) and that causes the processors to perform any one or more of the methodologies disclosed herein. The computer readable medium may include, but not be limited to, data repositories in the form of solid-state memories, optical media, and magnetic media. The computer readable medium does not include a transitory medium such as a propagating signal or a carrier wave.

ADDITIONAL CONSIDERATIONS

The systems and processes described herein beneficially improve the efficiency and reduce the cost of data retrieval and/or restoration. A large amount of data may be uploaded to a data store as a result of snapshots captured from numerous client devices. By providing a single snapshot to a client device, a data management system may decrease the consumed resources associated with data restoration for a more computational efficient and memory efficient process. Costs may be direct monetary costs to be spent to perform an action (e.g., read, write, store) or other costs such as computer resources and time in performing an action. The restoration of individual files, as opposed to entire disk snapshots, provides a less costly method for data restoration.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

In some embodiments, a computer-readable medium includes one or more computer-readable media that, individually, distributedly, or together, include instructions that, when executed by one or more processors, cause the one or more processors to perform, individually, distributedly, or together, the steps of the instructions stored on the one or more computer-readable media. Similarly, a processor includes one or more processors or processing units that, individually, distributedly, or together, perform the steps of instructions stored on a computer-readable medium. When in this disclosure refers to one or more processors perform one or more steps, in various embodiments the one or more processors may individually, distributedly, or together perform those steps and the use of the phrase one or more processors by no means to imply that a single process has to perform every single step. For example, in a device that has multiple processors, one processor may perform step one and another processor may perform step two. Similar situation may apply to distributed computing.

Any of the steps, operations, or processes described herein may be performed or implemented with one or more hardware or software engines, alone or in combination with other devices. In one embodiment, a software engine is implemented with a computer program product comprising a computer readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method for backing up a file from a data source to a data storage, the computer-implemented method comprising:
    reading a plurality of data chunks of the file from the data source in a buffer-bounded reading stage, the buffer-bounded reading stage comprising:

generating a bounded number of read requests, each read request causing a data chunk identified by a data offset to be loaded into a buffer, wherein one or more data chunks are loaded into the buffer concurrently;

queuing loaded data chunks for generating write requests to release the loaded data chunks, wherein one or more write requests are generated responsive to one or more data chunks associated with a consecutive order of data offsets are successfully loaded to the buffer; and generating an additional read request in response to a release of a loaded data chunk; and writing released data chunks released from the buffer-bounded reading stage to the data storage in a checkpointed writing stage, the checkpointed writing stage creating a checkpoint based on the data offset of data chunk that has completely transferred to the data storage.

2. The method of claim 1, further comprising:
determining a bounded number of read tokens based on a desired level of read concurrency, and wherein the bounded number of read requests is generated based on the bounded number of read tokens.

3. The method of claim 2, wherein each read request is associated with a plurality of parameters comprising a read buffer, a read-offset, and a size.

4. The method of claim 1, wherein the buffer-bounded reading stage further comprises:
receiving a read result corresponding to each read request, wherein the read result includes a read-offset;
maintaining an array of read-offsets that are ready to be pushed to an output channel;
maintaining a next read-offset that corresponds to a next read offset that should be pushed; and
pushing the read result to the output channel, wherein the read result is pushed based on an order determined based on the array of read offsets.

5. The method of claim 4, wherein the buffer-bounded reading stage further comprises:
increasing, responsive to receiving the read result, a write-offset value by a size of the read result.

6. The method of claim 1, wherein the checkpointed writing stage comprises:
maintaining an array of write offsets that correspond to the data offsets of the data chunks in the buffer-bounded reading stage; and
responsive to successfully writing a particular data chunk to the data storage, removing the data offset corresponding to the particular data chunk from the array of write offsets.

7. The method of claim 1, further comprising:
adding a key-value pair, including a key and a value, to a file map, wherein the file is the key, and a plurality of write parameters is the value, wherein the plurality of write parameters comprises the consecutive order of data offsets.

8. The method of claim 7, further comprising:
removing, responsive to a consecutive order of data offsets being an empty array, the file from the file map, the removal indicate of the file being backed up.

9. The method of claim 1 further comprising:
maintaining a number of checkpoints, wherein the number of checkpoints is determined based on a bounded number based on a number of active read requests.

10. The method of claim 1, wherein the checkpoint is created by storing a copy a file map, the file map including a file size and a value of commit offset, wherein the value of commit offset is calculated as a minimum value of the consecutive order of data offsets.

11. A non-transitory computer readable medium for storing program code comprising instructions for backing up a file from a data source to a data storage, wherein the instructions, when executed by one or more processors, causes the one or more processors to:
read a plurality of data chunks of the file from the data source in a buffer-bounded reading stage, the buffer-bounded reading stage further comprising instructions that when executed causing the processor to:
generate a bounded number of read requests, each read request causing a data chunk identified by a data offset to be loaded into a buffer, wherein one or more data chunks are loaded into the buffer concurrently;
queue loaded data chunks for generating write requests to release the loaded data chunks, wherein one or more write requests are generated responsive to one or more data chunks associated with a consecutive order of data offsets are successfully loaded to the buffer; and
generate an additional read request in response to a release of a loaded data chunk; and
write released data chunks released from the buffer-bounded reading stage to the data storage in a checkpointed writing stage, the checkpointed writing stage creates a checkpoint based on the data offset of data chunk that has completely transferred to the data storage.

12. The non-transitory computer readable medium of claim 11, further comprising stored instruction that when executed causes the one or more processors to:
determine a bounded number of read tokens based on a desired level of read concurrency, and wherein the bounded number of read requests is generated based on the bounded number of read tokens.

13. The non-transitory computer readable medium of claim 11, wherein the instructions to read a plurality of data chunks of the file from the data source in a buffer-bounded reading stage further comprises instructions that when executed by the processor causes the one or more processors to:
receive a read result corresponding to each read request, wherein the read result includes a read-offset;
maintain an array of read-offsets that are ready to be pushed to an output channel;
maintain a next read-offset that corresponds to a next read offset that should be pushed; and
push the read result to the output channel, wherein the read result is pushed based on an order determined based on the array of read offsets.

14. The non-transitory computer readable medium of claim 13, wherein the buffer-bounded reading stage further comprises:
increasing, responsive to receiving the read result, a write-offset value by a size of the read result.

15. The non-transitory computer readable medium of claim 11, wherein the instructions to read a plurality of data chunks of the file from the data source in a buffer-bounded reading stage further comprises instructions that when executed by the processor causes the one or more processors to:
maintain an array of write offsets that correspond to the data offsets of the data chunks in the buffer-bounded reading stage; and responsive to successfully writing a particular data chunk to the data storage, remove the data offset corresponding to the particular data chunk from the array of write offsets.

16. The non-transitory computer readable medium of claim 11, further comprising instructions that when executed causes the one or more processors to:
add a key-value pair, including a key and a value, to a file map, wherein the file is the key, and a plurality of write parameters is the value, wherein the plurality of write parameters comprises the consecutive order of data offsets.

17. The non-transitory computer readable medium of claim 16, further comprising instructions that when executed causes the one or more processors to:
remove, responsive to a consecutive order of data offsets being an empty array, the file from the file map, the removal indicate of the file being backed up.

18. The non-transitory computer readable medium of claim 11, further comprising instructions that when executed causes the one or more processors to:
maintain a number of checkpoints, wherein the number of checkpoints is determined based on a bounded number based on a number of active read requests.

19. The non-transitory computer readable medium of claim 11, wherein the checkpoint is created by storing a copy a file map, the file map including a file size and a value of commit offset, wherein the value of commit offset is calculated as a minimum value of the consecutive order of data offsets.

20. A computing system comprising:
one or more processors; and
memory storing instructions for backing up a file from a data source to a data storage, wherein the instructions, when executed by the one or more processors, cause the one or more processors to:
read a plurality of data chunks of the file from the data source in a buffer-bounded reading stage, the buffer-bounded reading stage comprising:
generate a bounded number of read requests, each read request causing a data chunk identified by a data offset to be loaded into a buffer, wherein one or more data chunks are loaded into the buffer concurrently;
queue loaded data chunks for generating write requests to release the loaded data chunks, wherein one or more write requests are generated responsive to one or more data chunks associated with a consecutive order of data offsets are successfully loaded to the buffer; and
generate an additional read request in response to a release of a loaded data chunk; and
write released data chunks released from the buffer-bounded reading stage to the data storage in a checkpointed writing stage, the checkpointed writing stage creates a checkpoint based on the data offset of data chunk that has completely transferred to the data storage.

* * * * *